(12) United States Patent
Uchida et al.

(10) Patent No.: US 8,715,850 B2
(45) Date of Patent: May 6, 2014

(54) BATTERY MODULE AND METHOD OF MANUFACTURING THE SAME

(75) Inventors: Osamu Uchida, Osaka (JP); Kazuhiro Ikurumi, Osaka (JP); Seiji Kumazawa, Osaka (JP); Koji Funami, Kyoto (JP); Masazumi Adachi, Hyogo (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 13/070,062

(22) Filed: Mar. 23, 2011

(65) Prior Publication Data

US 2011/0236728 A1    Sep. 29, 2011

(30) Foreign Application Priority Data

Mar. 26, 2010  (JP) ................................. 2010-071366
Dec. 20, 2010  (JP) ................................. 2010-282503

(51) Int. Cl.
*H01M 2/22*    (2006.01)
*H01M 2/26*    (2006.01)

(52) U.S. Cl.
USPC ......................................... 429/157; 429/158

(58) Field of Classification Search
USPC .................................................. 429/158, 157
See application file for complete search history.

(56) References Cited

U.S. PATENT DOCUMENTS

| 7,879,478 B2 * | 2/2011 | Kim et al. ........................ 429/82 |
| 7,960,052 B2 * | 6/2011 | Miyazaki et al. ............. 429/158 |
| 2005/0070164 A1 * | 3/2005 | Mita et al. ...................... 439/627 |
| 2007/0111088 A1 * | 5/2007 | Kim .............................. 429/158 |
| 2008/0096104 A1 * | 4/2008 | Kim .............................. 429/158 |

\* cited by examiner

*Primary Examiner* — John S Maples
(74) *Attorney, Agent, or Firm* — Hamre, Schumann, Mueller & Larson, P.C.

(57) ABSTRACT

A battery module 8 containing parallel blocks 9 connected to a protection circuit via a lead plate 2, wherein the parallel blocks 9 are welded to both sides of the lead plate without bending the lead plate 2 into a U shape. Thus it is possible to reduce the length of the lead plate 2 and suppress a voltage drop on the lead plate 2. Further, since the lead plate 2 is not bent into a U shape, the assembling accuracy of the battery module is improved and the battery module is easily packaged with a small size.

4 Claims, 11 Drawing Sheets

BATTERY MODULE AND METHOD OF MANUFACTURING THE SAME

FIELD OF THE INVENTION

The present invention relates to a battery module and a method of manufacturing the same, the battery module containing series-connected parallel blocks, each containing parallel-connected cells.

BACKGROUND OF THE INVENTION

In recent years, in the field of audio-visual apparatuses typified by notebook computers, small lithium-ion batteries with high output power have been used. In order to obtain a predetermined output and a predetermined capacity for a notebook computer, a battery module is used that contains series-connected parallel blocks, each containing parallel-connected cells.

The parallel blocks are connected in series via lead plates and the lead plates are connected to a protection circuit. The parallel blocks are hard to connect to both sides of the lead plate in view of welding. Thus in the related art, parallel blocks to be connected in series are welded to both ends of a surface of a lead plate and then the lead plate is bent, so that a space-saving battery module is formed.

FIG. 10 is a structural diagram showing an example of a battery pack containing cells connected in two rows and three columns according to the related art. Three parallel blocks 9 are connected in series via lead plates 2a and 2b to form a battery module 8. Each of the parallel blocks 9 contains two cells 1 connected in parallel. The battery module 8 is connected to a protection circuit board 3 via the lead plates 2a and 2b.

In a lithium-ion battery, in order to secure safety in any wrong use of the battery module 8 containing the connected cells 1, the protection circuit board 3 is provided in a battery pack 10 and prevents overcharge, overdischarge, and overcurrent. Particularly, in order to prevent overcharge having the highest degree of danger, the parallel blocks 9 are connected in series, each containing the parallel-connected cells 1.

The parallel blocks 9 are connected to the protection circuit board 3 via the lead plates 2a and 2b. The voltages of the parallel blocks 9 are monitored by the protection circuit board 3 to prevent overcharge.

FIG. 11 is a development showing a connection state of the parallel blocks according to the related art. As shown in FIG. 11, first in the battery module 8, the electrodes of metal jacket bottoms 1b are connected to the lead plate 2a, the metal jacket bottoms 1b serving as the negative electrodes of the two cells 1 constituting a parallel block 9a. Further, the electrodes of caps 1a are connected to one end of the lead plate 2b, the caps 1a serving as the positive electrodes of the two cells 1 constituting the parallel block 9a. Moreover, the electrodes of metal jacket bottoms 1b are connected to the other end of the lead plate 2b, the metal jacket bottoms 1b serving as the negative electrodes of the two cells 1 constituting an adjacent parallel block 9b.

Next, the electrodes of caps 1a are connected to one end of a lead plate 2b', the caps 1a serving as the positive electrodes of the two cells 1 constituting the parallel block 9b. Further, the other end of the lead plate 2b' is connected to the electrodes of metal jacket bottoms 1b serving as the negative electrodes of the two cells 1 constituting an adjacent parallel block 9c. Moreover, a lead plate 2a' is connected to caps 1a serving as the positive electrodes of the two cells 1 constituting the parallel block 9c.

The lead plates 2a, 2b, 2a', and 2b' are connected to the cells 1 by spot welding. A parallel-gap welding rod 12 is pressed onto the lead plates 2a, 2b, 2a', and 2b' at the long and short dashed lines of the cells 1 while applying a large current to the lead plates, so that the temperature of the metal is increased to the melting point of the metal and welding is performed by using heat generated by the contact resistance and the specific resistance of the metal.

The cells 1 and lead plates 2a, 2b, 2a', and 2b' connected thus constitute the battery module 8 in which the lead plates 2b and 2b' are bent into U shapes and the cells 1 are formed in two rows and three columns. The fabricated battery module 8 is connected to the protection circuit board 3 by soldering one ends of the lead plates 2a, 2b, 2a', and 2b', and then the battery module 8 is accommodated in a case.

DISCLOSURE OF THE INVENTION

In a method of manufacturing a battery module according to the related art, however, lead plates bent into U shapes may cause the following problem: upon discharging to audio-visual apparatuses such as a PC, a current passes through the lead plates from the battery module and a voltage drop may occur on the lead plates because of a specific resistance to the metal of the lead plates. The lead plates (2b and 2b' in FIG. 10) bent into U shapes are about twice longer than the lead plates (2a and 2a') that are not bent into U shapes, which may nearly double a voltage drop. As audio-visual apparatuses such as a PC are increased in capacity, a voltage drop becomes less negligible.

In the case where the lead plates are bent into U shapes in the manufacturing process, the bending step is added, the assembling accuracy is likely to vary after the formation of the battery module, and the bent parts protrude out of the outside shape of the battery module more than in the specifications, which does not allow size reduction. Further, it becomes difficult or impossible to package the battery module.

The present invention has been devised to solve the problems of the related art. An object of the present invention is to improve the assembling accuracy of a battery module while suppressing a voltage drop of lead plates, the battery module containing series-connected parallel blocks that are connected to a protection circuit via the lead plates, the parallel block containing parallel-connected cells.

In order to attain the object, a battery module of the present invention contains cells that are connected in parallel and series and include a first cell and a second cell, the first and second cells being connected such that the electrode of the cap of the first cell and the electrode of the metal jacket bottom of the second cell are connected to each other via a lead plate, wherein the electrode of the cap of the first cell is connected to one surface of the lead plate, and the electrode of the metal jacket bottom of the second cell is connected to the other surface of the lead plate.

Further, the electrode of the cap of the first cell and the electrode of the metal jacket bottom of the second cell are connected to each other via the lead plate, and the lead plate preferably includes multiple leads divided by slits.

Moreover, the electrode of the cap of the first cell and the electrode of the metal jacket bottom of the second cell are connected to each other via the lead plate, and the lead plate is preferably divided into multiple leads and connected to the electrode of the metal jacket bottom.

Further, the electrode of the cap of the first cell and the electrode of the metal jacket bottom of the second cell are connected to each other via the lead plate, wherein the lead plate may have a welded edge like an arc.

Moreover, the lead plate includes projecting portions in the direction of the one surface of the lead plate; a flat portion formed around the projecting portions; and a terminal connected to a protection circuit board, wherein the projecting portion is preferably connected to the electrode of the cap of the cell and the flat portion is preferably connected to the electrode of the metal jacket bottom of the cell by laser welding.

Further, the flat portion is preferably provided at a point where the projecting portions are adjacent to each other.

Moreover, the battery module further includes a support portion forming the projecting portion, wherein the support portion is preferably widened to the outside of the projecting portion as the support portion is farther away from a surface where the projecting portion is connected to the electrode of the cap of the cell.

A method of manufacturing a battery module according to the present invention, the battery module containing cells that are connected in parallel and series and include a first cell and a second cell, the first and second cells being connected such that the electrode of the cap of the first cell and the electrode of the metal jacket bottom of the second cell are connected to each other via a lead plate, the manufacturing method including: a first step of bending the lead plate including multiple leads divided by slits; a second step of connecting the electrode of the cap of the first cell to central one of the divided and bent leads, on one surface of the lead plate; a third step of connecting the electrode of the metal jacket bottom of the second cell to the other divided and bent leads that are paired on both ends of the lead plate, on the other surface of the lead plate; and a fourth step of folding back the bent lead plate to the original state after the second and third steps.

Further, in the second and third steps, the lead plate may be welded into arc shapes along the edge of the lead plate.

A method of manufacturing a battery module according to the present invention, the battery module containing cells connected in parallel and series via a lead plate including projecting portions and a flat portion adjacent to the projecting portions, the manufacturing method including the steps of: forming multiple parallel blocks, each containing the cells connected in parallel by spot welding the electrodes of the caps of the cells and the projecting portions; placing the electrodes of the metal jacket bottoms of one of the parallel blocks on the flat portion of the lead plate connected to another one of the parallel blocks; and connecting the parallel blocks in series by laser welding the electrodes of the metal jacket bottoms and the flat portion, the laser welding being performed by irradiating the flat portion with laser from a clearance formed between the parallel blocks by the projecting portions.

DESCRIPTION OF THE EMBODIMENTS

The following will specifically describe embodiments of the present invention in accordance with the accompanying drawings.

Figure 1A:
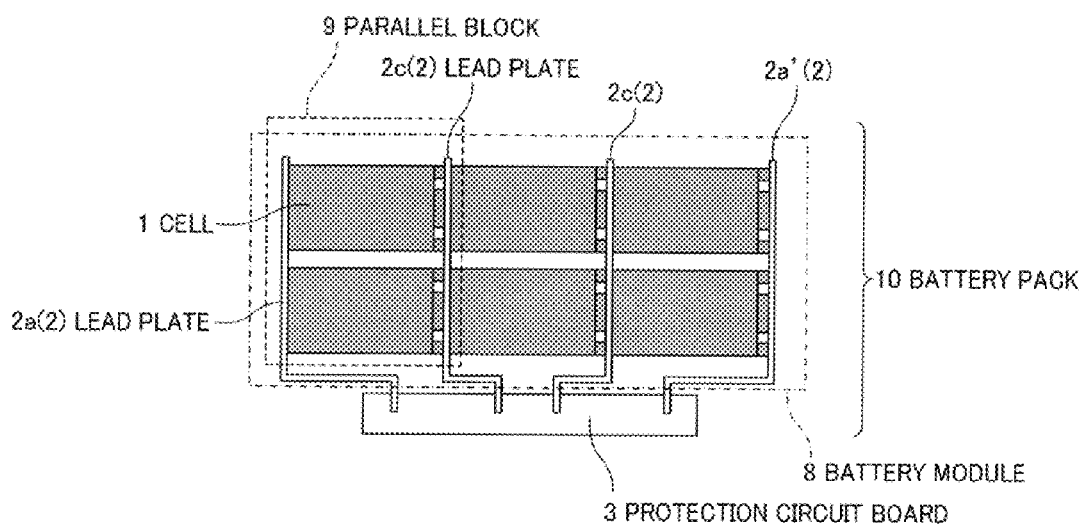
FIG. 1A is an explanatory drawing showing the structure of a battery module according to the present invention.
Figure 1B:
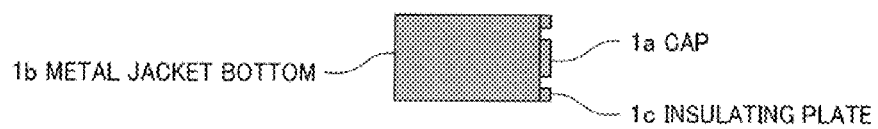
FIG. 1B is an explanatory drawing showing the structure of the battery module according to the present invention.

FIGS. 1A and 1B are explanatory drawings showing the structure of a battery module according to the present invention. FIG. 1A is a front view of the battery module and FIG. 1B is a front view of a cell. In FIG. 1A, a battery pack 10 containing cells in two rows and three columns is configured as an example of a battery module 8 according to the present embodiment. Three parallel blocks 9, each of which contains two cells 1 connected in parallel, are connected in series and constitute the battery module 8. The cells 1 in the battery module 8 are connected to a protection circuit board 3 via a lead plate 2.

As shown in FIG. 1B, the cell 1 includes a cap 1a whose electrode is a positive electrode and an metal jacket bottom 1b whose electrode is a negative electrode of the cell 1. Preferably, the cell 1 further includes a ring insulating plate 1c. In the configuration of the battery module 8, the insulating plate 1c can prevent a short circuit caused by contact between the metal jacket bottom 1b of the cell 1 and the metal jacket bottom 1b of the adjacent parallel block 9.

The lead plate 2 include a lead plate 2a' that connects the cap 1a serving as the positive electrode of one of the cells 1 of the parallel block 9 and the cap 1a of the other cell 1 and connects the cells 1 to the protection circuit board 3, and a lead plate 2a that connects the metal jacket bottom 1b serving as the negative electrode of one of the cells 1 of the parallel block 9 and the metal jacket bottom 1b of the other cell 1 and connects the cells 1 to the protection circuit board 3.

Moreover, the lead plate 2 includes lead plates 2c. One surface of the lead plate 2c connects the cap 1a of one of the cells 1 of the parallel block 9 and the cap 1a of the other cell 1, the other surface of the lead plate 2c connects the metal jacket bottom 1b of one of the cells 1 of the parallel block 9 and the metal jacket bottom 1b of the other cell 1, and the lead plates 2c connect the cells 1 to the protection circuit board 3. The lead plates 2c connect the series-connected parallel blocks 9, each containing the two parallel-connected cells 1.

Thus in order to secure safety in any wrong use of, e.g., a battery module made up of connected lithium-ion cells, the battery pack is provided with the protection circuit board 3 for preventing overcharge, overdischarge, and overcurrent. Particularly, in order to prevent overcharge having the highest degree of danger, the parallel blocks are connected in series, each containing the parallel-connected cells.

Further, in the battery module containing the parallel blocks connected to the protection circuit via the lead plate, the parallel blocks can be welded to both sides of the lead plate without bending the lead plate into a U shape. Thus it is possible to reduce the length of the lead plate and suppress a voltage drop on the lead plate. Since the lead plate is not bent into a U shape, the assembling accuracy is improved and the battery module is easily packaged with a small size.

Mainly in the following embodiments, the configuration of the lead plate 2 will be specifically described.

First Embodiment

Figure 2A:
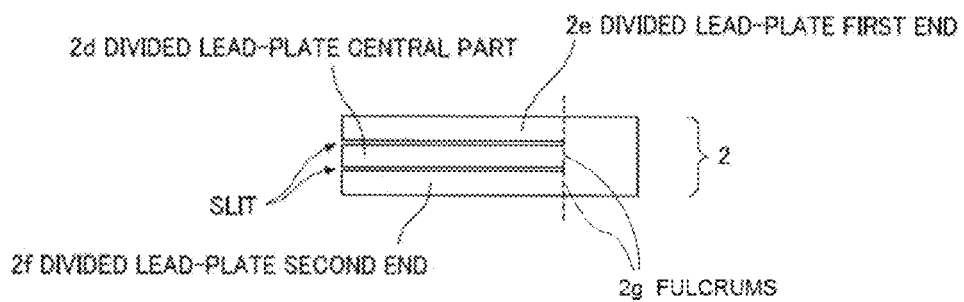
FIG. 2A is an explanatory drawing showing the structure of the battery module according to a first embodiment.
Figure 2B:
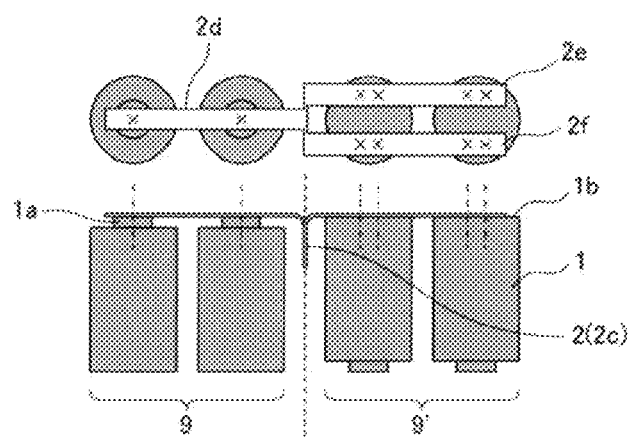
FIG. 2B is an explanatory drawing showing the structure of the battery module according to the first embodiment.
Figure 2C:
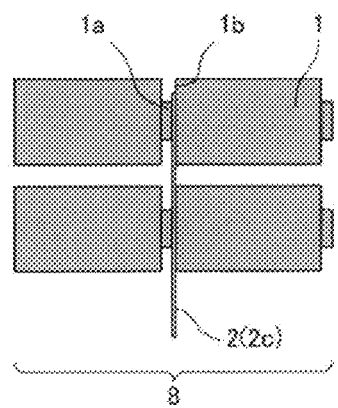
FIG. 2C is an explanatory drawing showing the structure of the battery module according to the first embodiment.

FIGS. 2A, 2B, and 2C are explanatory drawings showing the structure of a battery module according to a first embodiment.

As shown in FIG. 2A, one side of a lead plate 2 of the first embodiment is divided into three by slits and is connected to cells. The lead plate 2 has a divided lead-plate central part 2d, a divided lead-plate first end 2e, and a divided lead-plate second end 2f. The divided lead-plate central part 2d connects one surface of the lead plate to caps 1a serving as the positive electrodes of cells 1. The divided lead-plate first end 2e and the divided lead-plate second end 2f connect the other surface of the lead plate to metal jacket bottoms 1b serving as the negative electrodes of the cells 1.

Typically, the metal jacket of the cell 1 is cylindrically formed by a drawing and ironing (DI) process in which a metal coil material is drawn into a cup and the side wall is stretched by ironing in several steps to form the cylindrical body.

The lead plate 2 is a metal plate. The material of the lead plate 2 is not particularly limited and Ni, Cu, or Fe may be used. In order to facilitate welding to the metal jacket, NiFe (nickel-plated iron plate), NiCu (nickel-plated copper plate), or a clad-steel plate formed by bonding a copper plate and a nickel plate may be used. The lead plate is 0.1 mm to 0.15 mm in thickness and the thickness can be selected depending on the specific resistance of the material and the current capacity of a battery pack.

The thickness of the lead plate can be reduced according to the specific resistance of the metal of the lead plate. For example, a nickel plate has a thickness of about 0.15 mm and a copper plate can have a smaller thickness.

The metal jacket bottoms 1b of the cells 1 are connected by the divided lead plates (the divided lead-plate first end 2e and the divided lead-plate second end 2f) because the lead plate having a small thickness may be broken during or after welding. In order to prevent a break, the number of joints and the connection area are increased in the present invention, improving the reliability of connection.

Further, the metal jacket bottom has welding points for welding on the metal jacket bottom via a negative electrode and a current collector that have been provided in the metal jacket. The welding points are typically located around the center of the metal jacket bottom. In order to prevent the connection point of the lead plate and the metal jacket bottom from overlapping the welding points, the welding points are shifted from the center of the metal jacket bottom in the circumferential direction in the present invention as will be discussed later, thereby improving the reliability of connection.

Referring to a development of FIG. 2B showing a welding state, a method of connecting the lead plate and the cells will be described below. The three leads divided by the slits are the divided lead-plate central part 2d, the divided lead-plate first end 2e, and the divided lead-plate second end 2f, and the divided leads are temporarily opened by 90° or more with respect to the broken line of fulcrums 2g (shown in FIG. 2A). The divided lead-plate central part 2d is placed on the caps 1a serving as the positive electrodes of the two cells 1 connected in parallel as a parallel block 9. The divided lead-plate first end 2e and the divided lead-plate second end 2f are placed on the metal jacket bottoms 1b serving as the negative electrodes of the two cells 1 of a parallel block 9' to be connected in series with the parallel block 9. The lead plate is connected by spot welding while keeping this state.

Figure 11:
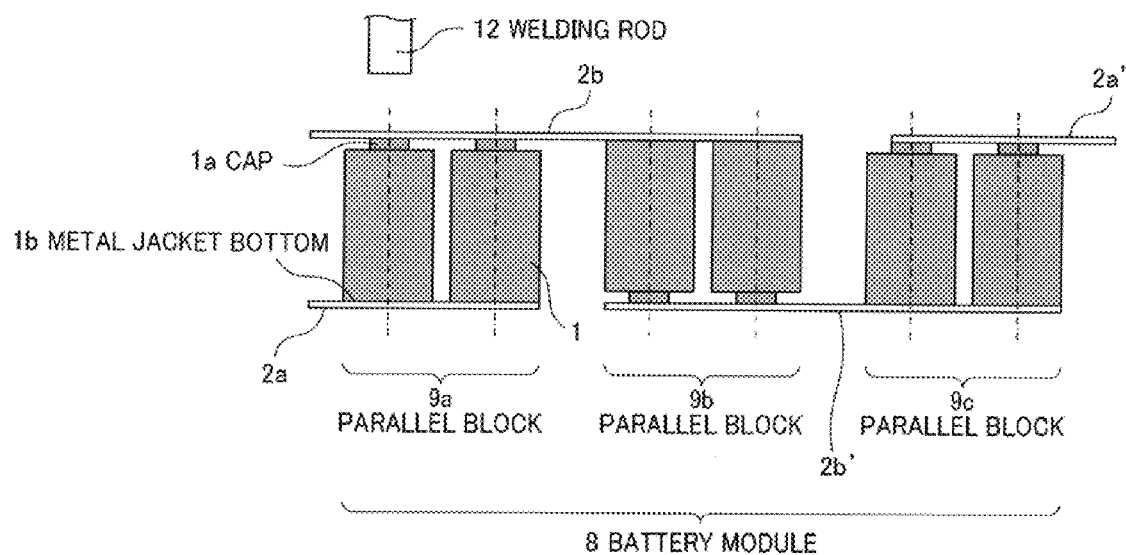
FIG. 11 is a development showing a connection state of parallel blocks according to the related art.

For example, a parallel-gap welding rod 12 (see FIG. 11) is pressed onto the lead plate 2 at the long and short dashed lines of the cells 1 while applying a large current, so that the temperature of the metal is increased to the melting point of the metal by heat generated by the contact resistance and the specific resistance of the metal and welding is performed on the cells 1 and the lead plate. In FIG. 2B, welding points are represented as "x". For example, the cap 1a of the cell 1 has a single welding point and the metal jacket bottom 1b has four welding points with line symmetry in parallel with the cells 1.

In the cells 1 and lead plate 2 connected thus, the divided lead-plate central part 2d, the divided lead-plate first end 2e, and the divided lead-plate second end 2f are folded back with respect to the broken line of FIG. 2B and are closed to the original state. Then, as shown in FIG. 2C, the adjacent cells 1 are connected on straight lines to form a battery module 8.

In order to facilitate welding in resistance welding, a welding current may be concentrated on the welding portions of the lead plate by forming projections on the lead plate while keeping the flatness of the welding rod.

According to the first embodiment, the battery module contains the series-connected parallel blocks, each of which contains the parallel-connected cells and is connected to the protection circuit via the lead plate. In the battery module, the lead plate is divided and connected to the metal jacket bottoms of the cells. Thus even when one of the divided leads is disconnected in the event of a drop or impact, the connection can be kept and the battery module can be obtained with high reliability. Simultaneously, the lengths of the lead plates can be suppressed, so that a voltage drop can be suppressed on the lead plates and the assembling accuracy can be improved.

Second Embodiment

Figure 3A:
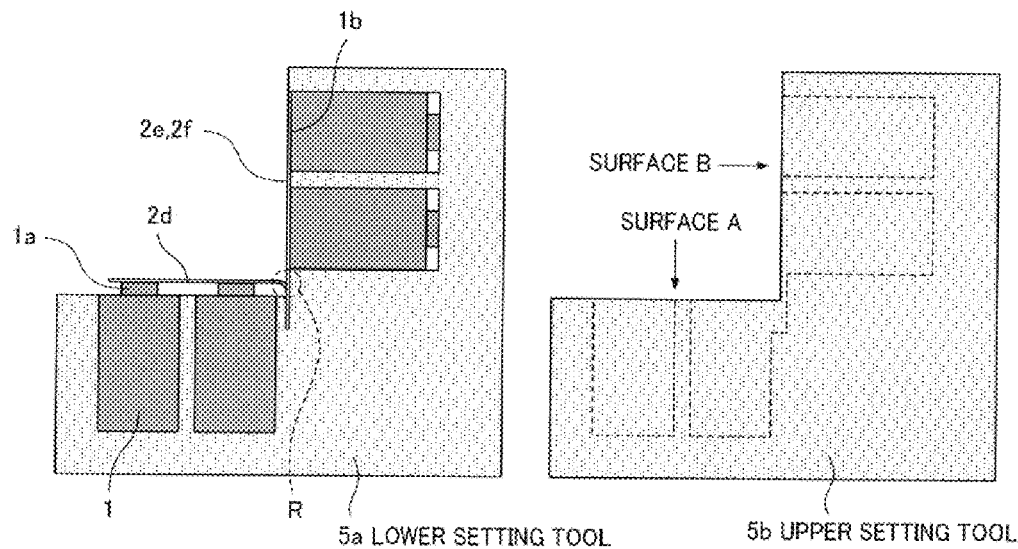
FIG. 3A is an explanatory drawing showing a method of manufacturing a battery module according to a second embodiment.
Figure 3B:
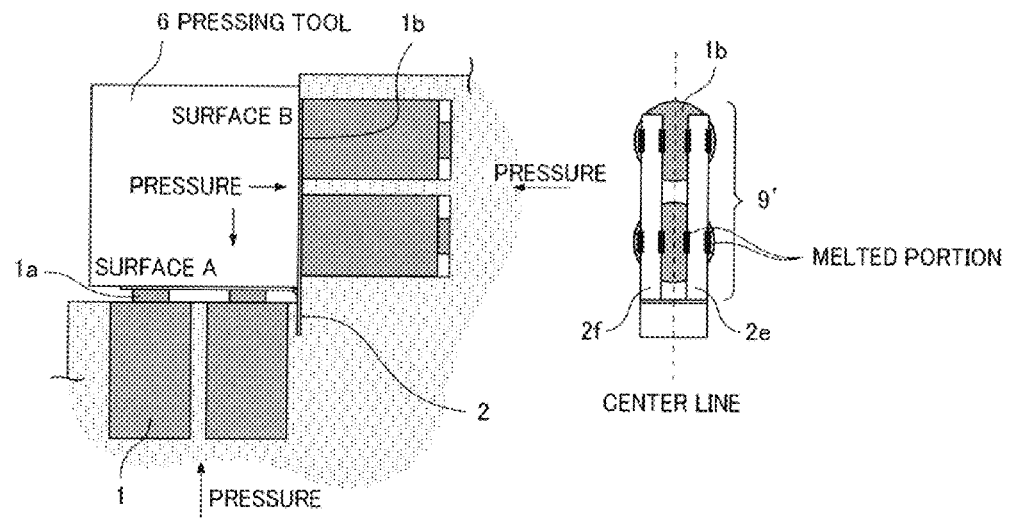
FIG. 3B is an explanatory drawing showing the method of manufacturing the battery module according to the second embodiment.
Figure 3B:
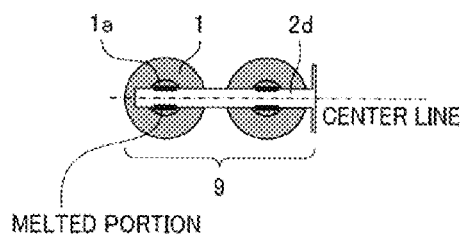
Figure 3C:
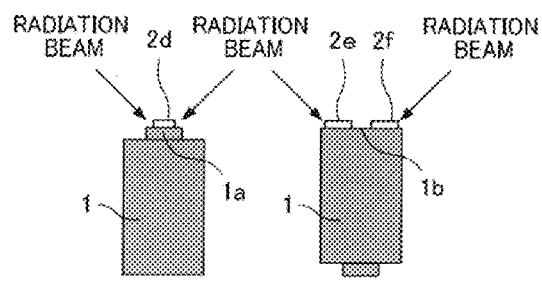
FIG. 3C is an explanatory drawing showing the method of manufacturing the battery module according to the second embodiment.

FIGS. 3A, 3B, and 3C are explanatory drawings showing a method of manufacturing a battery module according to a second embodiment. FIG. 3A shows a setting tool used for manufacturing the battery module. FIG. 3B shows a pressing state of a pressing tool. FIG. 3C shows radiation beams during melting.

As in the first embodiment, a lead plate 2 used in the second embodiment has one side divided into three by slits and connected to cells 1. The lead plate 2 is made up of a divided lead-plate central part 2$d$, a divided lead-plate first end 2$e$, and a divided lead-plate second end 2$f$.

In a method of connecting the lead plate 2 and the cells 1, as shown in FIG. 3A, the cells 1 and the lead plate 2 are set on a lower setting tool 5$a$ of a setting tool 5. The lower setting tool 5$a$ has recessed parts of predetermined dimensions to position the cells 1 and the lead plate 2, so that the cells 1 and the lead plate 2 are set at predetermined positions.

The divided lead-plate central part 2$d$ is temporarily bent at R of FIG. 3A, and then the lead plate 2 is inserted at the predetermined position of the lower setting tool 5$a$. Next, an upper setting tool 5$b$ is fit onto the lower setting tool 5$a$. The upper setting tool 5$b$ similarly has recessed parts that are opposed to the, positions of the recessed parts of the lower setting tool 5$a$, thereby temporarily positioning the cells 1 and the lead plate 2.

Next, as shown in FIG. 3B, a pressing tool 6 is pressed to caps 1$a$ serving as the positive electrodes of the two cells 1 of a parallel block 9 so as to sandwich the divided lead-plate central part 2$d$ on surface A. Further, on surface B, the pressing tool 6 presses the divided lead-plate first end 2$e$ and the divided lead-plate second end 2$f$ to metal jacket bottoms 1$b$ serving as the negative electrodes of the two cells 1 of a parallel block 9' to be connected in series with the parallel block 9.

The lead plate 2 and the cells 1 kept in this state are connected by laser welding by means of laser beams. The divided lead-plate central part 2$d$ and the caps 1$a$ of the two cells 1 of the parallel block 9 are connected by, as indicated by thick lines (melted portions) of FIG. 3B, emitting beams such as YAG laser along the edges of the divided lead-plate central part 2$d$ from the directions of arrows of radiation beams in FIG. 3C, so that the metals of the divided lead-plate central part 2$d$ and the caps 1$a$ are melted and connected.

Moreover, the divided lead-plate first end 2$e$ and the divided lead-plate second end 2$f$ are connected to the metal jacket bottoms 1$b$ of the two cells 1 of the parallel block 9' by, as indicated by thick lines (melted portions) of FIG. 3B, emitting beams such as YAG laser along the edges of the divided lead-plate first end 2$e$ and the divided lead-plate second end 2$f$, so that the metals of the divided lead-plate first end 2$e$, the divided lead-plate second end 2$f$, and the metal jacket bottoms 1$b$ are melted and connected.

Welding is performed on, e.g., positions indicated by the thick lines (melted portions) of FIG. 3B. For example, the cap 1$a$ of the cell 1 has two welding points along the edges of the divided lead plate central part 2$d$ with line symmetry with respect to the center line of the cell 1, and the metal jacket bottom 1$b$ has four welding points with line symmetry with respect to the center line of the cell 1.

In the cells and lead plate connected thus, the divided lead-plate central part 2$d$, the divided lead-plate first end 2$e$, and the divided lead-plate second end 2$f$ are folded back with respect to R of FIG. 3A and are closed to the original state. Then, as shown in FIG. 2C, the adjacent cells 1 are connected on straight lines to form a battery module 8.

The lead plate 2 is a metal plate. The material of the lead plate 2 is not particularly limited and Ni, Cu, or Fe may be used. In order to facilitate welding to the metal jacket, NiFe (nickel-plated iron plate), NiCu (nickel-plated copper plate), or a clad-steel plate formed by bonding a copper plate and a nickel plate may be used. Typically, the material of the cell metal jacket is NiFe (nickel-plated iron plate). Thus when the material of the lead plate is NiCu (nickel-plated copper plate) or a clad-steel plate formed by bonding a copper plate and a nickel plate is used, dissimilar metal connection is obtained. In this case, laser radiation weaves from the Ni side having a high melting point, that is, from the cell side, preventing copper with a low melting point from melting off. Further, laser may be radiated to the Ni side having a high melting point, that is, the cell side for a long time.

Figure 4A:
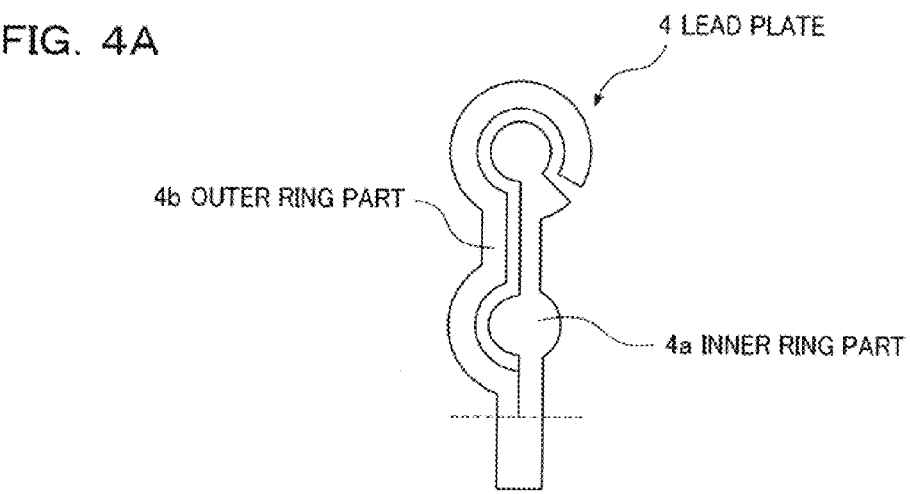
FIG. 4A is an explanatory drawing of a battery module using another lead plate according to the second embodiment.
Figure 4B:
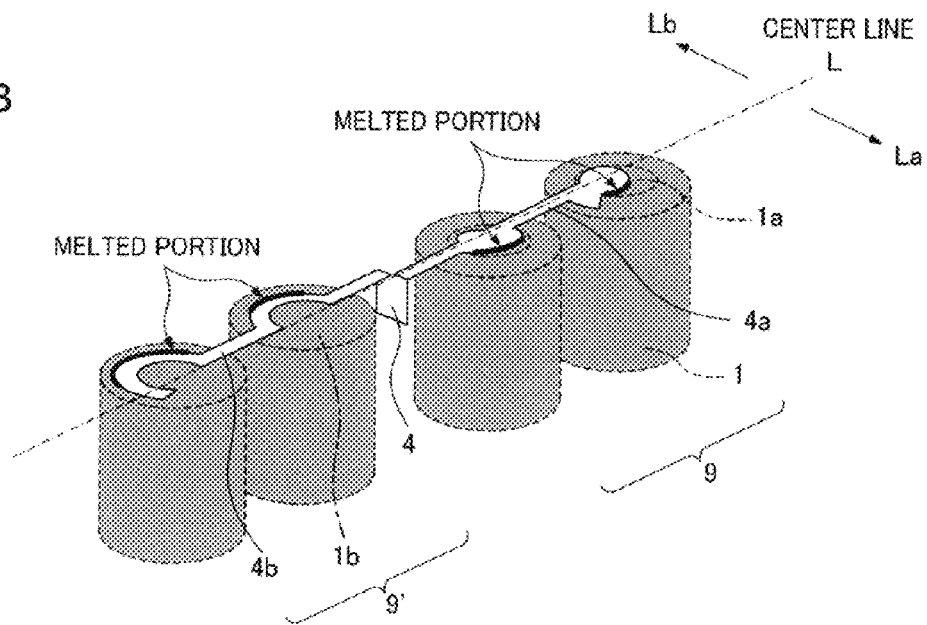
FIG. 4B is an explanatory drawing of the battery module using the other lead plate according to the second embodiment.
Figure 4C:
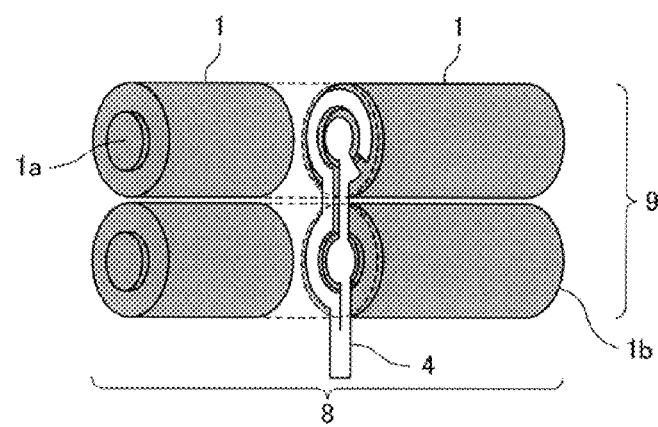
FIG. 4C is an explanatory drawing of the battery module using the other lead plate according to the second embodiment.

As shown in FIG. 4A, the lead plate 2 may be replaced with a lead plate 4 having a circular outside shape. FIGS. 4A, 4B, and 4C are explanatory drawings of a battery module using another lead plate according to the second embodiment. As shown in FIG. 4A, the lead plate 4 is divided by an arc-shaped slit into an inner ring part 4$a$ and an outer ring part 4$b$. In a welding state shown in the development of FIG. 4B, the inner ring part 4$a$ is connected to the caps 1$a$ of the cells 1 and the outer ring part 4$b$ is connected to the metal jacket bottoms 1$b$ of the other cells 1. FIG. 4C is a transparent perspective view partially showing the lead plate of the battery module.

In the development of FIG. 4B, welding points are located at, e.g., melted portions (black portions) indicated by arrows. For example, the caps 1$a$ of the cells 1 are welded along arc shapes on the outer circumference of the inner ring part 4$a$ of the lead plate 4, and the metal jacket bottoms 1$b$ are welded along arc shapes on the outer circumference of the outer ring part 4$b$.

The arc-shaped welding points on the caps 1$a$ of the cells 1 and the inner ring part 4$a$ of the lead plate 4 are concentrated on La side with respect to center line L of the cells 1. The arc-shaped welding points on the metal jacket bottoms 1$b$ and the outer ring part 4$b$ of the lead plate 4 are concentrated on Lb side with respect to the center line L of the cells 1.

According to the second embodiment, when the lead plate 4 and the cells 1 are connected, the lead plate 4 may be made of low-resistance materials such as copper and a copper alloy. Thus the connection resistance of the lead plate can be reduced.

Further, the lead plate and the cells can be connected in a short time by laser welding, and a larger connection area than in resistance welding makes it possible to manufacture a battery module with high connection reliability. Moreover, the welding points are located on lines with line symmetry with respect to the center line L of the cells 1 or the welding points are arc-shaped, so that impacts such as vibrations are uniformly applied to the cells 1. Thus it is possible to achieve a battery module with high durability and reliability.

Third Embodiment

In the related art, the positive and negative electrodes of parallel blocks to be connected in series are hard to weld and connect on both sides of a single flat lead plate. In the foregoing embodiments, the lead plate is divided into parts to be connected to the positive electrodes and the negative electrodes, the parallel blocks are welded to the parts in an opened state, and the parts are returned to the shape of the single lead plate. Hence, without bending the lead plate into U shape, the cells are connected in parallel to form the parallel blocks and the parallel blocks are connected in series to fabricate the battery module.

A feature of the present embodiment is that a lead plate is bent to form projecting portions beforehand thereon, so that a clearance allowing laser radiation is formed between parallel blocks connected in series. With this configuration, the positive electrodes and the negative electrodes of the parallel blocks to be connected in series can be welded and connected on both sides of the single flat lead plate.

Referring to FIGS. 5 to 7C, the following will describe the structure of the lead plate and a battery module using the lead plate according to a third embodiment.

Figure 5:
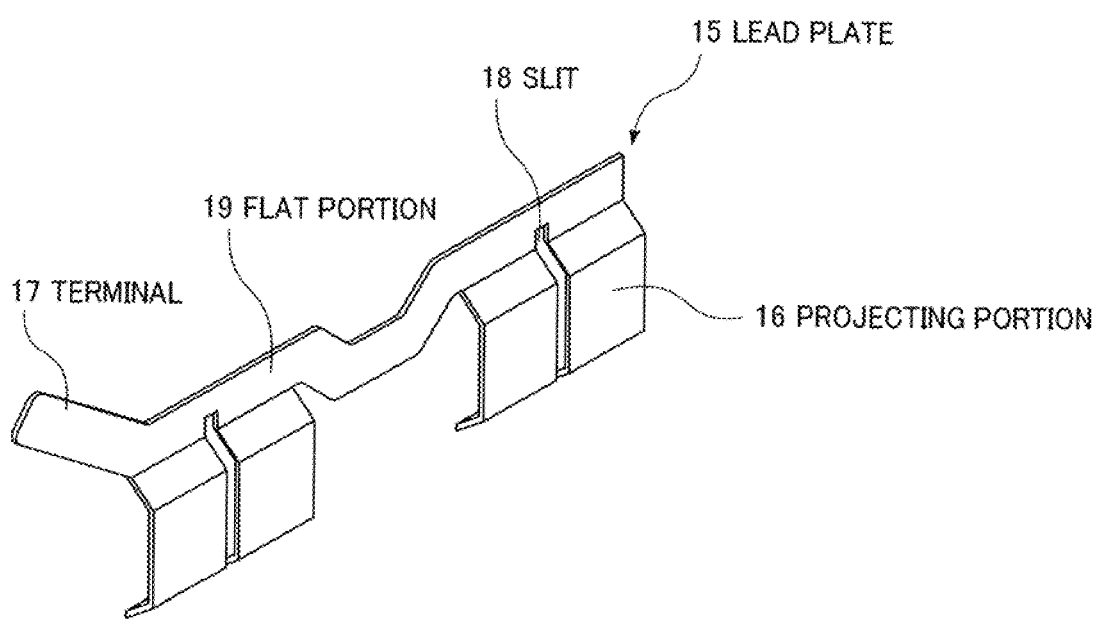
FIG. 5 is a perspective view showing the configuration of a lead plate according to a third embodiment.
Figure 6A:
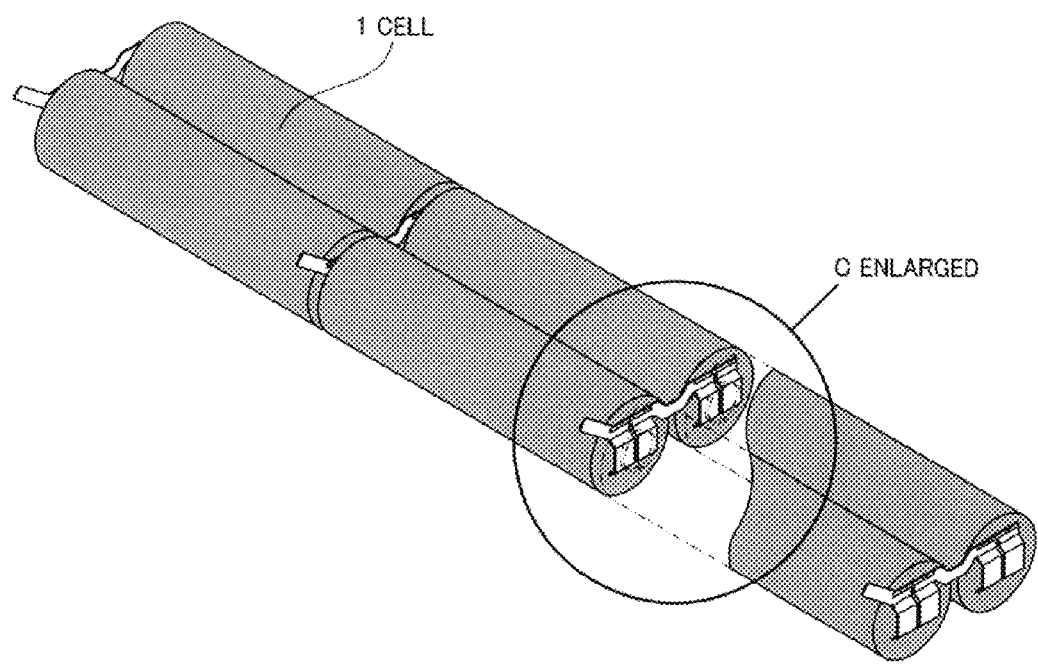
FIG. 6A is a perspective view showing the configuration of a battery module according to the third embodiment.
Figure 6B:
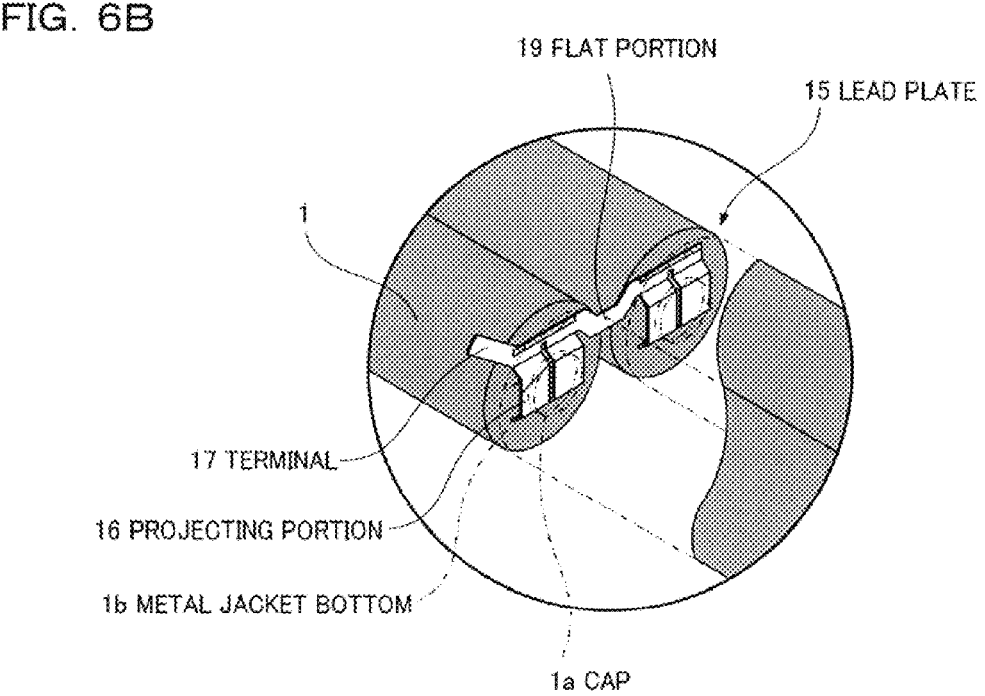
FIG. 6B is a perspective view showing the configuration of the battery module according to the third embodiment.
Figure 7A:
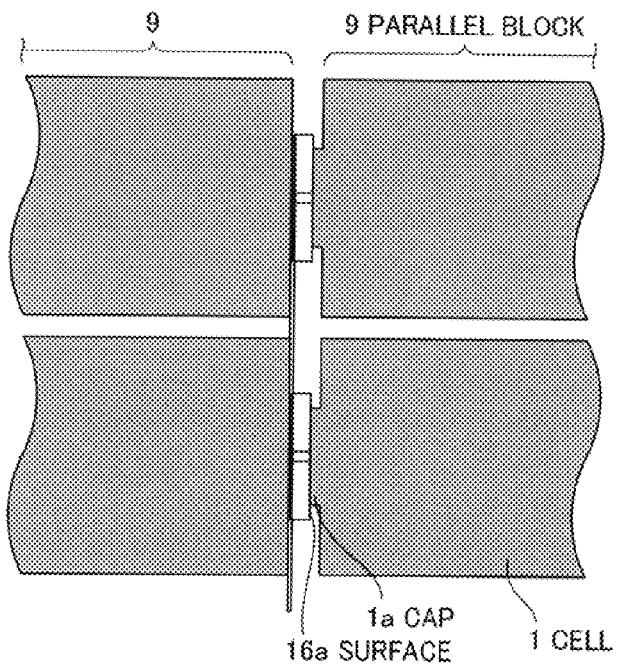
FIG. 7A shows a connection state of the lead plate of the battery module according to the third embodiment.
Figure 7B:
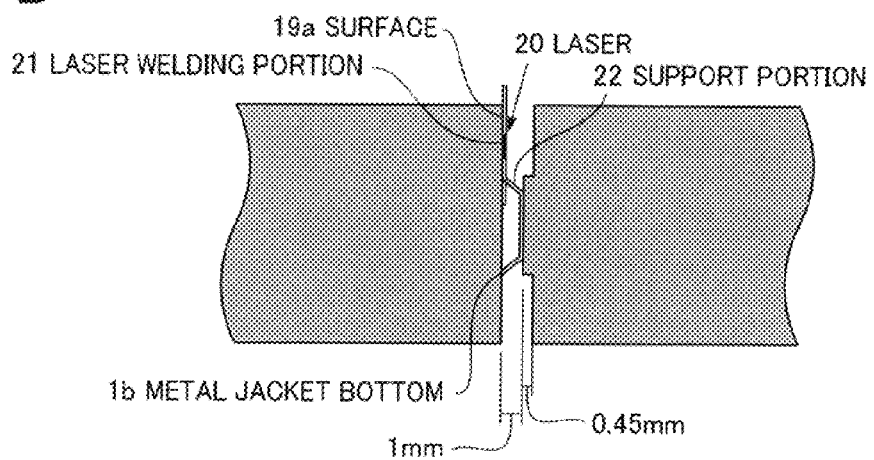
FIG. 7B shows the connection state of the lead plate of the battery module according to the third embodiment.
Figure 7C:
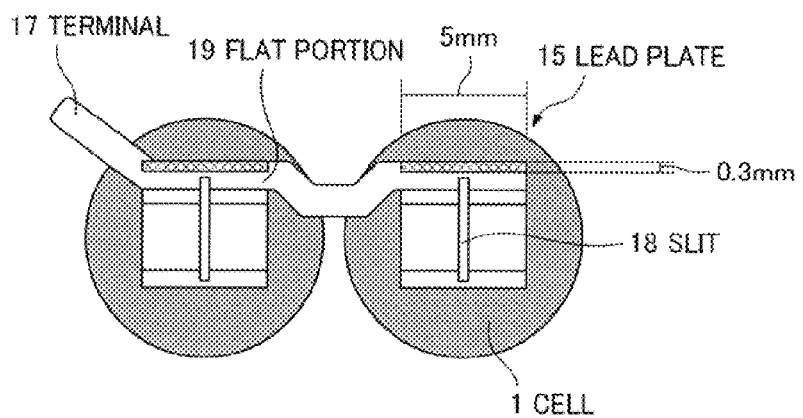
FIG. 7C shows the connection state of the lead plate of the battery module according to the third embodiment.

FIG. 5 is a perspective view showing the configuration of the lead plate according to the third embodiment. FIGS. 6A and 6B are perspective views showing the configuration of the battery module according to the third embodiment. FIG. 6A is a perspective view showing the overall configuration of the battery module and FIG. 6B is a conceptual perspective view of enlarged part C of FIG. 6A. FIGS. 7A, 7B, and 7C show a connection state of the lead plate of the battery module according to the third embodiment.

As shown in FIG. 5, a lead plate 15 of the present embodiment is formed by bending a flat lead plate into projecting portions 16. The projecting outer surfaces of the projecting portions 16 are connected to caps serving as the positive electrodes of cells. A flat portion 19 provided around the projecting portions 16 is connected to metal jacket bottoms, which serve as the negative electrodes of the cells, on the opposite side of the lead plate from the projecting direction of the projecting portions 16. The lead plate 15 further includes a terminal 17 connected to a protection circuit board, so that the parallel blocks connected to the lead plate 15 are connected to the protection circuit. FIG. 5 illustrates the lead plate 15 used for connecting the parallel blocks in series, the parallel block containing the two parallel-connected cells. Thus in this configuration, two pairs of the projecting portions 16 and the flat portion 19 are provided. When the lead plate is used for parallel blocks each of which contains at least three parallel-connected cells, at least three pairs of the projecting portions 16 and the flat portion 19 may be connected in series. In FIG. 5, the pairs of the projecting portions 16 and the flat portion 19 are connected in series by the flat portion 19. The pairs may be connected in any configuration. For example, the pairs may be connected in series by the projecting portions 16 or the flat portion 19 and the projecting portions 16.

Referring to FIGS. 5 to 7C, the following will describe the configuration of the battery module according to the present embodiment. In this example, the battery module contains the three series-connected parallel blocks, each containing the two parallel-connected cells.

Caps 1a serving as the positive electrodes of cells 1 constituting a parallel block 9 are connected to surfaces 16a of the projecting portions 16 of the lead plate 15 by spot welding or the like, and the cells 1 constituting the parallel block 9 are connected in parallel via the lead plate 15. On the lead plate 15 between the parallel blocks 9, metal jacket bottoms 1b serving as the negative electrodes of the cells 1 are connected to the flat portion 19 by laser welding, on a surface 19a of the flat portion 19 on the opposite side from the surface 16a, the cells 1 constituting the parallel block 9 are connected in parallel via the lead plate 15, and the two parallel blocks 9 are connected in series. Further, on both ends of the battery module, the caps 1a or the metal jacket bottoms 1b of the cells 1 constituting the parallel block 9 are connected in parallel via the lead plate 15. Moreover, the terminal 17 is formed on each of the lead plates 15 and is connected to a protection circuit board (not shown), so that the protection circuit board monitors the voltages of the parallel blocks 9 to prevent overcharge, overdischarge, and overcurrent.

In this configuration, a support portion 22 of the projecting portion 16 may be orthogonal to a contact surface with the cap 1a and the flat portion 19 but the support portion 22 is preferably widened to the outside of the projecting portion 16 as the support portion 22 is farther away from the contact surface with the cap 1a. Hence, the flat portion 19 is more firmly bonded to the metal jacket bottoms 1b during laser welding and a bonding strength improves during welding.

Laser welding between the surface 19a of the flat portion 19 and the metal jacket bottoms 1b is performed by irradiating laser welding portions 21 with laser 20 from a clearance formed between the parallel blocks 9 by the projecting portions 16 of the lead plate 15.

In the present embodiment, the caps 1a and the projecting portions 16 are connected and the lead plate 15 connected to the parallel block 9 is connected to the metal jacket bottoms 1b of another parallel block 9. In this state, the laser 20 is emitted from the clearance formed between the parallel blocks 9 by the projecting portions 16 of the lead plate 15. Thus the surface 19a of the flat portion 19 and the metal jacket bottoms 1b are laser welded at the laser welding portions 21. In this way, the parallel blocks 9 can be connected in series while being bonded on both sides of the lead plate 15 without bending the lead plate 15 into a U shape, thereby reducing an increase in the length of the lead plate 15 and suppressing a voltage drop. Since the parallel blocks 9 can be bonded to both sides of the lead plate 15 without bending the lead plate 15 into a U shape, it is possible to keep high assembling accuracy, facilitate packaging, and store the lead plate 15 between the parallel blocks 9, allowing size reduction of the battery module.

The flat portion 19 may be formed at two points around the projecting portion 16. Preferably, the single flat portion 19 is formed next to the projecting portion 16 and connects one end of the metal jacket bottom 1b and the lead plate 15. With this configuration, a region other than the flat portion 19 of the lead plate 15 is not fixed and can move freely. Thus even when impacts such as vibrations are transmitted to the battery module, vibrations applied to the lead plate 15 can be released from a free end and impacts can be absorbed on the free end, thereby improving the earthquake and shock resistance of the connection of the lead plate 15 and the connection reliability of the battery module.

Generally, in view of bond strength and prevention of liquid leakage, the laser welding portion 21 preferably has a welding depth of about 0.08 mm to 0.10 mm. The flat portion is about 5.0 mm in width relative to the typical dimensions of the cell. When the lead plate 15 has a thickness of 0.15 mm, the laser welding portion 21 requires a length of about 0.3 mm in parallel with the laser radiation direction to obtain a bonding strength. Since the jacket of the cell 1 is exposed around the metal jacket bottom 1b, the projecting portion 16 requires a height of at least 1.0 mm to obtain a sufficient angle of radiation of the laser 20 to the laser welding portion 21 having a length of about 0.3 mm inside the jacket of the cell, for example, when the positive electrode of the cap 1a is 0.45 mm in height.

Referring to FIGS. 8A to 9C, the following will describe a method of manufacturing the battery module according to the present embodiment. In this example, the three parallel blocks are connected in series in the battery module, the parallel block containing the two parallel-connected cells.

Figure 8A:
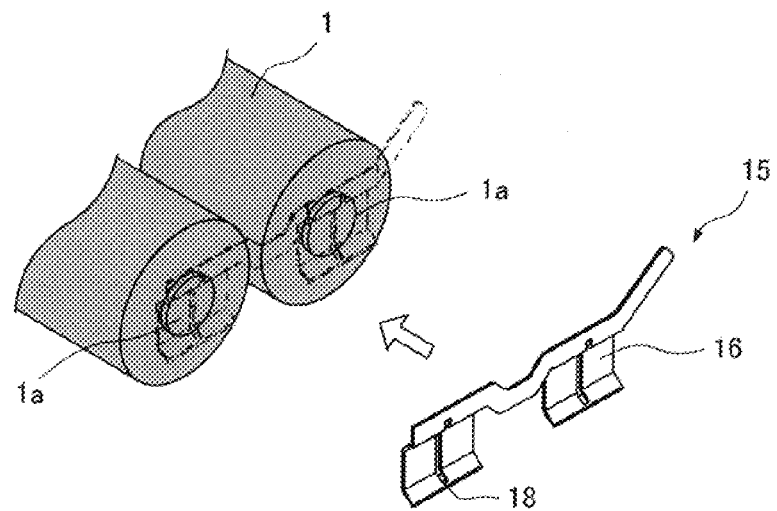
FIG. 8A is an explanatory drawing showing the step of bonding caps and the projecting portions of the lead plate in a method of manufacturing the battery module according to the third embodiment.
Figure 8B:
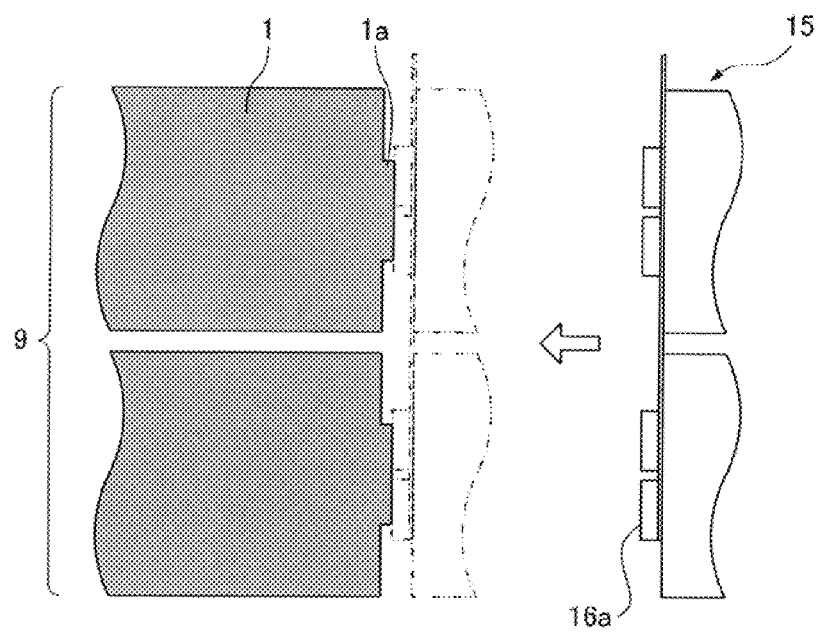
FIG. 8B is an explanatory drawing showing the step of bonding the caps and the projecting portions of the lead plate in the method of manufacturing the battery module according to the third embodiment.
Figure 9A:
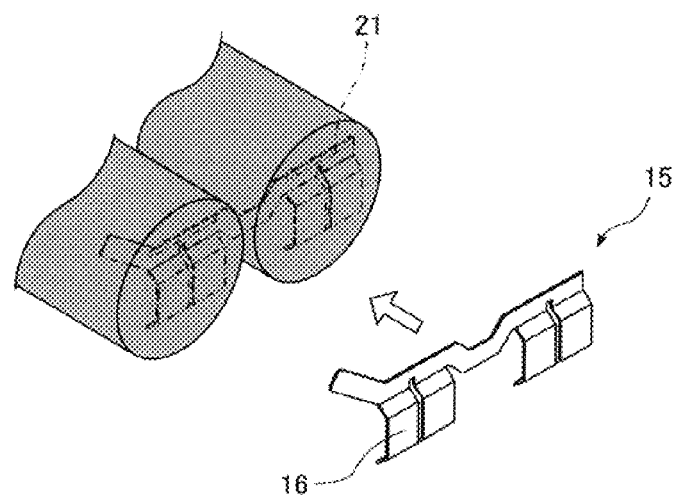
FIG. 9A is an explanatory drawing showing the step of bonding metal jacket bottoms and the flat portion of the lead plate in the method of manufacturing the battery module according to the third embodiment.
Figure 9B:
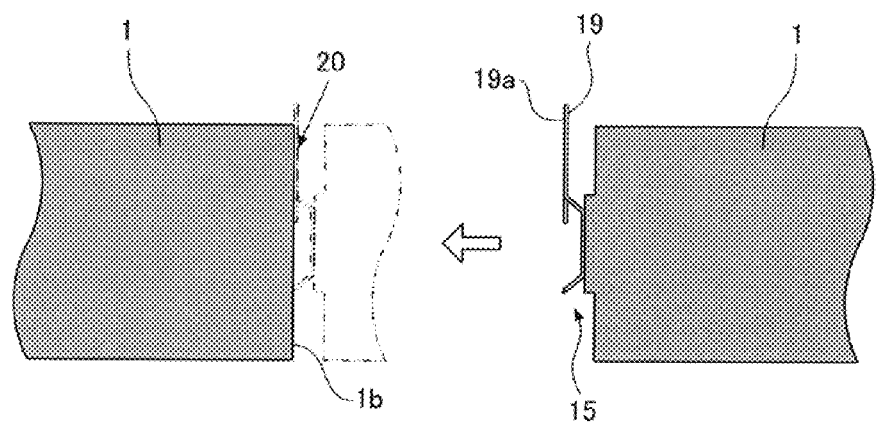
FIG. 9B is an explanatory drawing showing the step of bonding the metal jacket bottoms and the flat portion of the lead plate in the method of manufacturing the battery module according to the third embodiment.
Figure 9C:
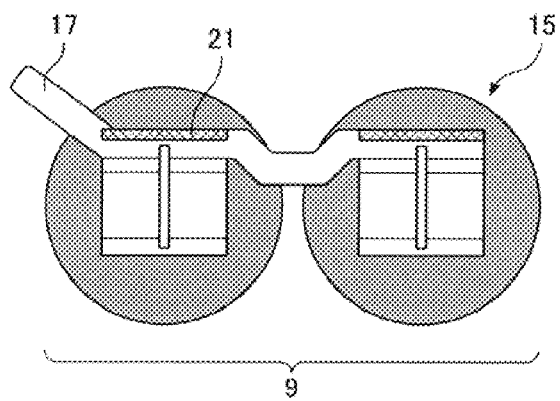
FIG. 9C is an explanatory drawing showing the step of bonding the metal jacket bottoms and the flat portion of the lead plate in the method of manufacturing the battery module according to the third embodiment.
Figure 10:
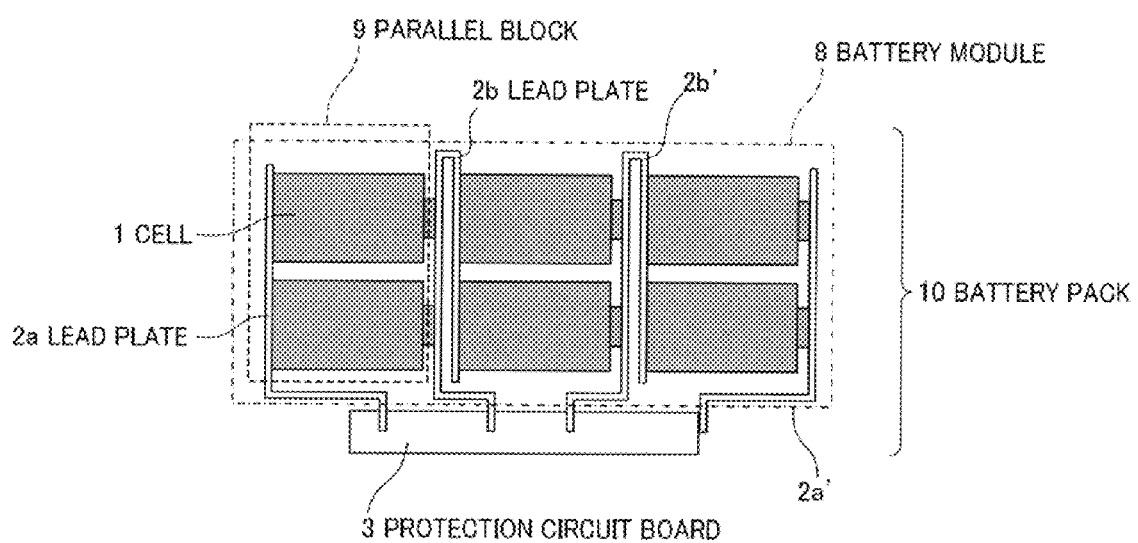
FIG. 10 is a structural diagram showing an example of a battery pack containing cells connected in two rows and three columns according to the related art.

FIGS. 8A and 8B are explanatory drawings showing the step of bonding the caps and the projecting portions of the lead plate in the method of manufacturing the battery module according to the third embodiment. FIG. 8A is a perspective view and FIG. 8B is a plan view. FIGS. 9A, 9B, and 9C are explanatory drawings showing the step of bonding the metal jacket bottoms and the flat portion of the lead plate in the method of manufacturing the battery module according to the third embodiment. FIG. 9A is a perspective view. FIG. 9B is a plan view taken along a direction parallel to the parallel direction of the cells. FIG. 9C is a perspective plan view showing a bonding state of the metal jacket bottoms to the lead plate.

First, the parallel block 9 is formed in which the two cells 1 are connected in parallel by using the lead plate 15. In this case, spot welding is performed on the caps 1a serving as the positive electrodes of the two cells 1 and the surfaces 16a of the two projecting portions 16 formed on the single lead plate 15, so that the parallel block 9 containing the two parallel-connected cells 1 is formed. The three parallel blocks 9 are similarly formed (FIGS. 8A and 8B). Although a slit 18 is not always necessary on the projecting portion 16, the slit 18 on the projecting portion 16 ensures a current path between the projecting portion 16 and the cap 1a, facilitating spot welding.

Next, the parallel blocks 9 are connected in series by using the lead plate 15 having been spot welded to the caps 1a. The metal jacket bottoms 1b serving as the negative electrodes of the cells 1 constituting the parallel block 9 are placed on the surface 19a of the flat portion 19 of the lead plate 15 bonded to the caps 1a of another one of the parallel blocks 9. In this state, the flat portion 19 is irradiated with the laser 20 from the clearance formed between the parallel blocks 9 by the projecting portions 16, so that the flat portion 19 and the metal jacket bottoms 1b are laser welded at the laser welding portions 21. The metal jacket bottoms 1b are bonded thus to the lead plate 15 having been bonded to the parallel block 9, so that the two parallel blocks 9 are bonded to each other (FIGS. 9A, 9B, 9C). Then, another one of the parallel blocks is connected in series by the same method.

Finally, the metal jacket bottoms 1b of the two cells 1 exposed on the end of the series connection of the three parallel blocks 9 are bonded to the lead plate 15, fabricating the battery module containing the three series-connected parallel blocks, each containing the two parallel-connected cells.

After that, the terminals 17 of the lead plates 15 are connected to the protection circuit board (not shown) and the battery module is packaged, so that a battery pack is fabricated.

In the manufacturing method of the present embodiment, the caps 1a and the projecting portions 16 are connected to each other and the lead plate 15 connected to the parallel block 9 is placed on the metal jacket bottoms 1b of another parallel block 9. In this state, the laser 20 is emitted from the clearance formed between the parallel blocks 9 by the projecting portions 16 of the lead plate 15. According to this method, the surface 19a of the flat portion 19 and the metal jacket bottoms 1b are laser welded at the laser welding portions 21, so that the parallel blocks 9 can be connected in series while being bonded on both sides of the lead plate 15 without bending the lead plate 15 into a U shape. Thus it is possible to reduce an increase in the length of the lead plate 15 and suppress a voltage drop. Since the parallel blocks 9 can be bonded to both sides of the lead plate 15 without bending the lead plate 15 into a U shape, it is possible to keep high assembling accuracy, facilitate packaging, and store the lead plate 15 between the parallel blocks 9, allowing size reduction of the battery module.

In the foregoing embodiments, a battery pack to be incorporated into a PC or the like was described as an example of a battery module and a method of manufacturing the same according to the present invention. The present invention is not limited to battery packs for PCs and may be used for battery packs for audio-visual apparatuses other than PCs and in the field of electronic equipment such as a machine tool.

What is claimed is:

1. A battery module containing cells that are connected in parallel and series and include a first cell and a second cell, the first and second cells being connected such that an electrode of a cap of the first cell and an electrode of a metal jacket bottom of the second cell are connected to each other via a lead plate, and the lead plate comprising a first lead and a second lead divided by a slit, the first and second leads being bendable at a fulcrum, wherein while bending at least one of the first and the second leads, the electrode of the cap of the first cell is connected to the first lead by spot welding, and the electrode of the metal jacket bottom of the second cell is connected to the second lead by spot welding, and after connecting the first and second cells, the at least one of the first and second leads is folded back at the fulcrum.

2. The battery module according to claim 1, wherein the electrode of the cap of the first cell and the electrode of the metal jacket bottom of the second cell are connected to each other via the lead plate, the lead plate having a welded edge like an arc.

3. The battery module according to claim 1, wherein the fulcrums of the first and second leads are disposed in a straight line.

4. The battery module according to claim 1, wherein a surface of the lead plate to which the first cell is connected is different from a surface of the lead plate to which the second cell is connected.

* * * * *